United States Patent [19]

Bullock

[11] 3,755,060

[45] Aug. 28, 1973

[54] STRUCTURAL SHAPES HAVING IMPROVED PHYSICAL PROPERTIES

[75] Inventor: Ronald E. Bullock, Fort Worth, Tex.

[73] Assignee: General Dynamics Corporation, Ft. Worth, Tex.

[22] Filed: Aug. 16, 1971

[21] Appl. No.: 171,993

[52] U.S. Cl.............. 161/143, 156/166, 156/182, 156/441, 156/554, 161/57, 161/60, 176/10
[51] Int. Cl............................................. B32b 3/00
[58] Field of Search...................... 176/10; 161/143, 161/172, 175, 57, 60; 156/166, 182, 441, 544

[56] References Cited
UNITED STATES PATENTS

| | | | |
|---|---|---|---|
| 3,573,123 | 3/1971 | Siegel et al. ........................ | 156/171 |
| 3,462,340 | 8/1969 | Hough .............................. | 161/170 |

Primary Examiner—William A. Powell
Assistant Examiner—James J. Bell
Attorney—John R. Duncan and Hugo F. Mohrlock

[57] ABSTRACT

A method is disclosed for the fabrication of highly strengthened structural shapes and tectonic components which are particularly useful in the construction of aircraft, missiles and aerospace vehicles.

2 Claims, 4 Drawing Figures

Patented Aug. 28, 1973

INVENTOR
RONALD E. BULLOCK
BY
Charles C. Woodward
ATTORNEY

Patented Aug. 28, 1973

INVENTOR
RONALD E. BULLOCK
BY
Charles C. Woodward
ATTORNEY

STRUCTURAL SHAPES HAVING IMPROVED PHYSICAL PROPERTIES

The process involves the irradiation, in an oxygen-free environment, of conventional graphite filaments by exposing them to a nuclear reactor's fast-neutron fluence, preferably having a magnitude of about $1 \times 10^{19}$ $n/cm^2$ (E > 1 MeV), and then applying the resinous polymer matrix in its fluid or plastic state and subsequently curing to form the finished structural ribbon-like tape. The resultant filamentary, tectonic tape composite will then exhibit substantially twice the tensile strength of respective conventional filamentary composite materials in the direction of the collimated filaments. The elastic modulus of the radiation-strengthened composite is also increased but to a somewhat lesser degree or on the order of 80–85 percent The physical character of such shapes may be varied by desideratum to range from a plenarily isotropic construction to one which is characterized by a substantially anistropic quality, while simultaneously being endowed with a significantly higher ratio in strength-to-weight and stiffness-to-mass properties than that which exists in conventional aerospace materials. This selective variation is made possible and effected by the use of ribbon-like tapes comprising collocated, unidirectional transmuted graphite filaments embodied in planar concourse within an organic, thermosetting resin matrix such as within an epoxy resin base polymer. The end product or structural shape is then custom made from such tapes or ribbons by a predetermined orientation, detrusion and lamination of strips and layers thereof as required for attainment of the desired physical characteristics of the object composite shape. Included in this method of fabrication is a transmutation-by-irradiation step which is resultant in a substantial doubling of the tensile strength of the graphite filamentary structural composite tape material or ribbon-like composites of collimated graphite filaments in a resinous plastic matrix.

BACKGROUND OF THE INVENTION

Structural composite shapes, comprised of single or laminated layers of filamentary tapes or ribbon materials which are oriented in predetermined unidirectional patterns and laminated in dimensionally controlled parameters in order to evolve such structural shapes and endow them with desired anistropic qualities, have only recently emerged as a new technology. Therefore radiation mutated graphite filaments embodied within tectonic composite tapes, ribbons and the like, which are comprised of irradiated and unidirectionally collocated graphite filaments embodied within a matrix of polymerized resin constitutes an even later equally significant innovation in the art.

While it is known to the art that an approximate factor-of-three increase occurs in the strength and in Young's modulus for artificially manufactured, bulk graphite when exposed to fast neutron fluences on the order of $1 \times 10^{19}$ $n/cm^2$ (E > 1 MeV) in nuclear reactors, no evidence exists that any use has ever been evolved for such bulk graphite in the prior art or that graphite filaments and fibers, which possess a markedy different crystalline structure than that of bulk graphite, have ever been heretofore conceived or produced.

The preponderance of research that was directed to the structural character of irradiated bulk graphite was undertaken during the earlier stages of reactor development when the former was being evaluated for its potential use as a neutron moderator in such early nuclear reactors. This was at a time when graphite's potential as a high-strength material still went unrecognized by those conversant with the art. Large blocks of graphite were required to have only sufficient strength to provide support when they were stacked one upon the other. Consequently, the strength of bulk graphite was of small concern in reactor design once it was determined that its strength increased under exposure to radiation. Further, no record of any recent or contemporary work relating to mechanical strenths of irradiated graphite has been uncovered to date.

Conventional bulk graphite has a three-dimensional lattice structure in which lattice planes within crystallites are stacked parallel, one upon the other, with definite orientations between atoms from plane-to-plane. Lattice planes of graphite crystallites within filaments and fibers of this material are likewise stacked parallel one upon the other, but significantly, each plane is randomly rotated about its perpendicular axis and there exists no definite orientation of atoms from plane-to-plane; such two-dimensional lattice structure being generally referred to as turbo-stratic. Moreover, lattice planes in graphite filaments and fibers are significantly separated to a greater degree than those in bulk graphite and the crystallites of graphite filaments and fibers are more uniformly aligned than in bulk graphite by a very considerable order of magnitude.

Graphite-reinforced composites have previously been irradiated with low doses of electrons and gamma rays in order to cure the plastic resin in composites, but radiation doses required to strengthen graphite fibers are much in excess of those which plastics can withstand without being severely degraded in strength. The atomic processes here are altogether different, of course, for ionization of atoms (stripping away of electrons) is the important process in radiation curing, and lightweight, low-energy particles are sufficient to do this. Radiation strengthening requires that significant numbers of carbon atoms (greater than one in a thousand) be displaced from their lattice sites in graphite, and heavier (neutrons, protons, or alpha particles), more energetic particles are required to do this. Thus radiation strengthening of graphite fibers and radiation curing of plastics are in no way similar, and maximum radiation strengthening of graphite-plastic composites requires that the fibers be irradiated before being embodied in the plastic matrix. The resulting composite material can subsequently be cured with lower doses of radiation or in other conventional ways, as desired.

SUMMARY OF THE INVENTION

This invention relates generally to an improved method for the fabrication of tectonic filamentary composite structural shapes.

More particularly the invention relates to a process for significantly increasing the physical strength of such structural shapes and especially their tensile strength, cross-breaking strength, longitudinal-flexure strength as well as for increasing the elastic modulus thereof by rearranging the crystalline structure of conventional graphite filaments or fibers, from which the component ribbon-like elements of such structural shapes are formed.

Accordingly, it is one object of the invention to provide a method for the fabrication of graphite tape composite structural shapes through enhancing their physical properties by bombardment of the graphite filament's molecular structure with high intensity nuclear radiation, collimating the resultant mutated filaments into ribbon-like strips and applying an inorganic plastic, resinous matrix over and about such strips, and then curing or polymerizing the resultant graphite/plastic composite to produce a ribbon-like structural material of greatly superior strength. The ultimate tectonic shapes and structural parts are eventually fabricated and fashioned by employment of a strip or tape lay-up and laminating means such as by simple, manual means or preferably by apparatus capable of meticulously and precisely orientating, collimating, spacing, laminating and trimming or cutting and pressure placing by detruding the tape over a pattern or upon a suitable die-mold of the desired configuration.

BRIEF DESCRIPTION OF THE DRAWINGS

Other objects of the present invention will become readily apparent to those skilled in the art from the following detailed description of the process in conjunction with the accompanying drawings, wherein.

DESCRIPTION OF THE PREFERRED EMBODIMENT

In the present state-of-the-art graphite filaments are produced by heat treatment of carbon-containing fiberous precursors, such as polyacrylonitrile. Such filaments of graphite, having undergone a recrystallization process result in a unique turbo-stratic crystal latticework that are widely separated and uniformly aligned wherein the 3-dimensional lattice planes are stacked in substantial parallel alignment with each plane randomly rotated about its perpendicular axis but with no definite orientation of atoms from plane-to-plane.

After being produced, such graphite filaments are usually wound upon spools for convenience in handling, packaging, shipping, etc.

The present process does not encompass the production of filamentary graphite per se, but does presume that the filament with which it starts has been strengthened to a substantial degree by alignment of the crystalline lattice planes along the filament lengths, this having been controlled to a reasonable extent by holding the fiberous precursors under tension while being heat treated to produce graphite in a manner known in the art. This known heat treat process, however, is in no way similar or analogous to the atomic rearrangements that are effected by the irradiation step of the presently disclosed process.

Figure 1:
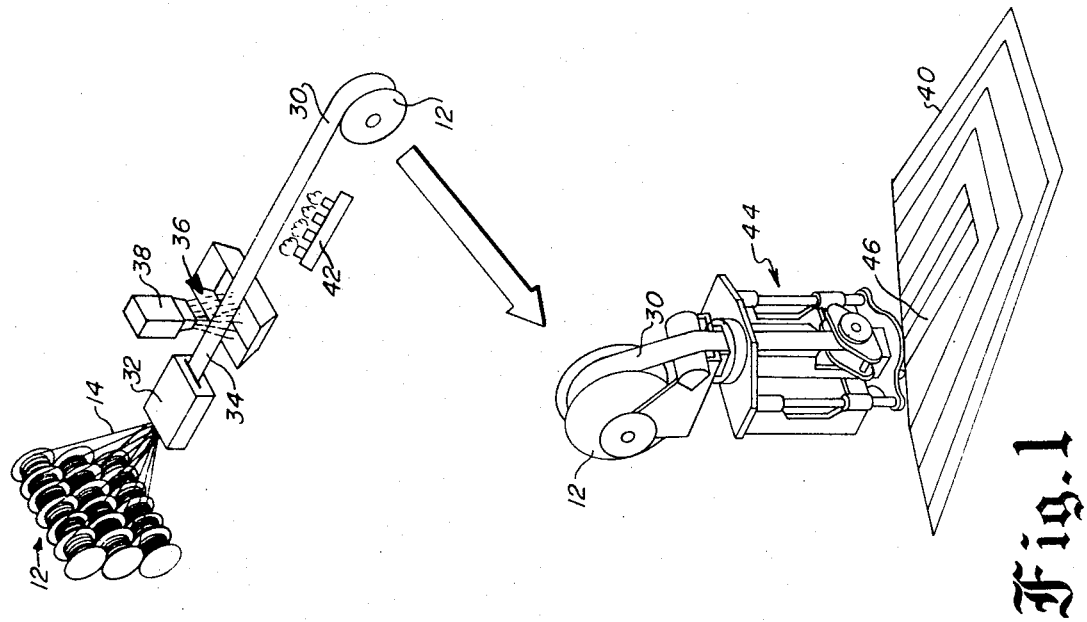
FIG. 1 is an illustrative schematic depicting the phase progression and regimen of transition from the component elements of a filamentary tectonic tape into a composite structural shape resultant from the present invention.
Figure 2:
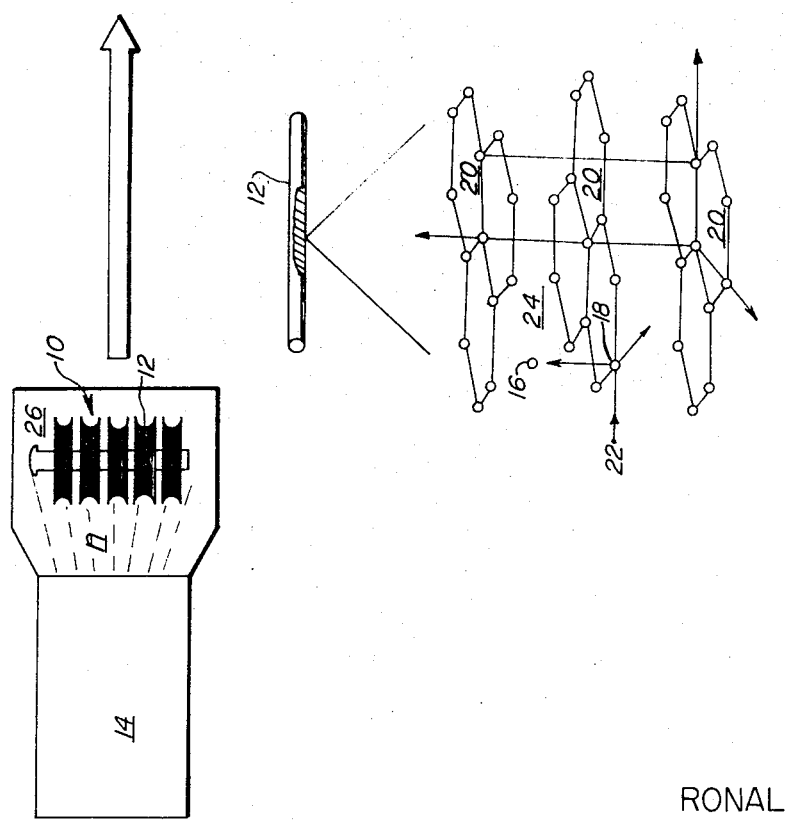
FIG. 2 is a diagrammatic illustration of the unique atomic transmutation of the crystalline lattice structure of the filamentary graphite employed in the invention.

Referring now to the drawings, FIG. 1 shows an exemplary array of spools 10 containing continuous strands of graphite filaments 12 being exposed to fast-neutron fluence (E > 1 MeV) $n$ in excess of $1 \times 10^{18}$ $n/cm^2$ in emission from a typical or conventional nuclear reactor 14. As illustrated in FIG. 2 displacement of carbon atoms 16 from their lattice sites 18 in planes 20 by impacting neutrons 22 almost invariably results in such displaced atoms coming to rest in interlayer spaces 24 of the lattice, thus significantly increasing the atomic binding between planes to thereby produce a much stronger material due to the fact that resistance to intraplane slippage is thus very much augmented. For processing, as best shown in FIG. 1, the spools 10 of untreated graphite filaments 12 are so disposed and arranged that they are exposed to the high energy neutron radiation field $n$ from a conventional nuclear reactor 14 and thereby exposed to fast-neutron fluences of $1 \times 10^{19}$ $n/cm^2$ (E > 1 MeV) in an oxygen free environment 26 and at normal ambient temperatures; fluence for purposes of this disclosure, being designated as the common unit of radiation dose for neutron exposure. It is obtained from the product of the neutron exposure rate per unit area (neutron flux in $n/cm^2$-sec.) and exposure time. Thus, the fluence provides a measure for the number of incident neutrons per unit cross-sectional area of target ($n/cm^2$), and only neutrons having energies in excess of 1 MeV are considered herein to be constituent to the so-called fast-neutron fluence $n$. Radiation induced mutation of the crystalline lattice structure of FIG. 2 is resultant in very significant improvements in the physical character of the object material, such as a significant increase in strength. This increase is measured in terms of fluence since the degree of mutation is directly dependent upon exposure dose and not upon the rate of radiation exposure, i.e., the same strengthening is effected whether the irradiation is at a rate R for a time $t$ or at a rate $R/n$ for a time $nt$. The spools 10, FIG. 1, of graphite filament 12 are preferably irradiated by the fast-neutron fluence 22 of reactor 14, at ambient temperature, and in an oxygen free environment 26, until substantially at least one in every thousand carbon atoms 16 of the filaments 12 are displaced from their lattice station 18 by impinging energetic neutrons 22, such displacement concentration requires exposure, as hereinabove stated, to a fast-neutron fluence (E > 1 MeV) $n$ of or in excess of $1 \times 10^{18}$ $n/cm^2$ for conventional nuclear reactors.

The radiation dosage required to displace substantially one in every thousand atoms in graphite filaments, no matter what the radiation source, is to be regarded as the lower limit of the range claimed for strengthening and otherwise improving the physical properties of graphite filaments and fibers. Above this threshold radiation dose, the strength, etc., of graphite filaments steadily and consistently increases, under radiation exposure, until substantially one in every hundred atoms are displaced; such displacement concentration requiring exposure to a fast-neutron fluence of, or in excess of, $1 \times 10^{19}$ $n/cm^2$ from conventional nuclear reactors.

An upper limit for radiation dosage, beyond which graphite fibers begin to deteriorate is not yet manifest. However, irradiation beyond an upper limit fast-fluence of $1 \times 10^{20}$ $n/cm^2$ from conventional nuclear reactors is neither desirable nor economically propitious to the objectives of the present invention. Thus, for typical reactors, the pragmatical range limits for radiation dosage in neutron strengthening of graphite filaments lie in the interval between $1 \times 10^{18}$ $n/cm^2$ and $1 \times 10^{20}$ $n/cm^2$; the optimum exposure dose being substantially $1 \times 10^{19}$ $n/cm^2$. This entire range is well above any other radiation exposure known to have been previously applied in any irradiation treatment for graphite for any purpose.

The above high levels of radiation, which are required to strengthen and improve graphite filaments necessitates that they be irradiated before being embodied in a plastic matrix, rather than subsequent thereto because plastics are severely deteriorated and degraded by such high exposures. Further, the graphite filaments are, of necessity, irradiated in an oxygen free environment 26 in order to realize full potential of radiation strengthening, for, otherwise, the carbon atoms will be lost from the fiber surfaces through radiation-induced oxidation, i.e., under the influence of a radiation field, carbon atoms on graphite surfaces will interact chemically with oxygen molecules in air to form gaseous carbon dioxide. The surfaces of such oxidized fibers are left rough and pitted, and brittle fracture will initiate at these flaw sites when such fibers are stressed. Thus, some of the benefits of internal radiation strengthening of graphite fibers will be negated through surface erosion unless the irradiation is carried out in the absence of oxygen. Carbon dioxide is also given off when bulk graphites are irradiated, but since surface effects and strength are not critical in bulk graphite, such oxidation is of no concern.

Figure 3:
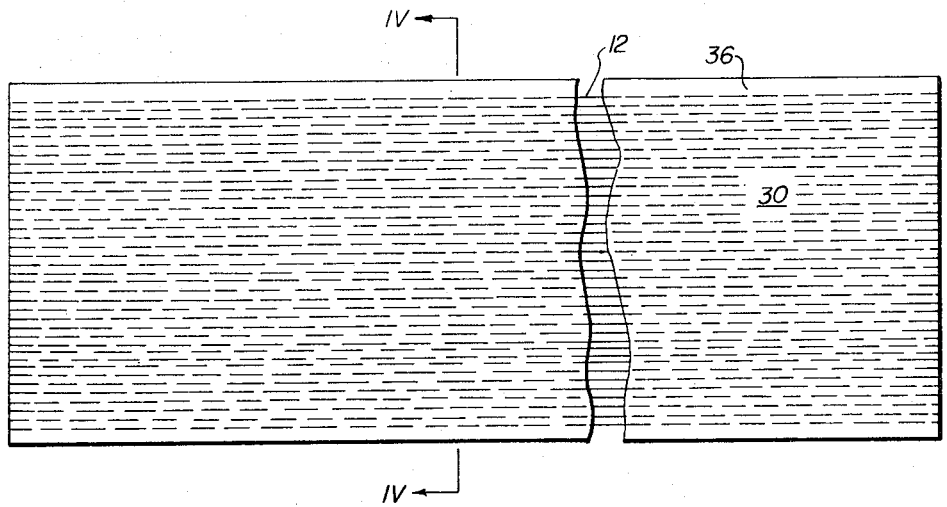
FIG. 3 is a plan view, with portions thereof broken away, of the irradiated graphite filaments as embodied in the resinous plastic matrix comprising the finished composite tape of the present invention.
Figure 4:
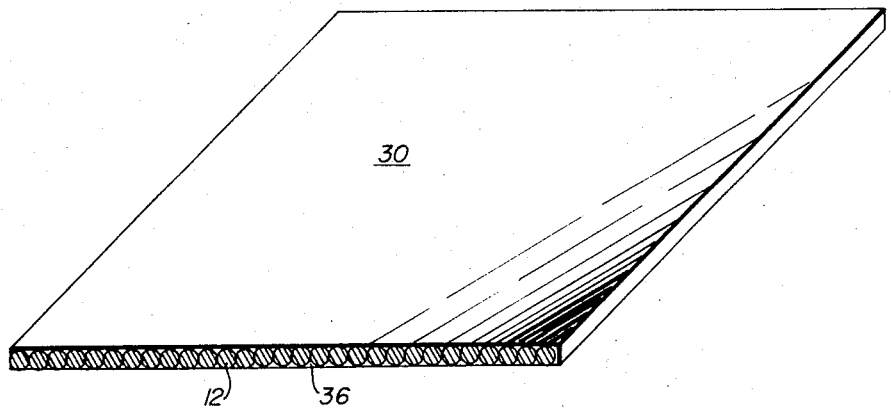
FIG. 4 is an isometric, partly sectional view of the composite tape of the present invention taken along the line IV—IV of FIG. 3.

Following irradiation by neutron fluence $n$, FIG. 1, spools 10 or other suitable receptacles are arranged for further processing of the graphite filaments 12 into ribbon-like tape 30, FIGS. 3 and 4, the subsequent steps may be deferred for such further processing at a more appropriate time and place. From each of the prearranged spools 10 a strand 12 of irradiated graphite filament is directed into planar relationship with strands from other spools and thence into and through collocator 32 where they are properly tensioned and collocated in congruous concourse 34 with other strands and otherwise prepared to receive the resinous shroud of matrix 36. Exactness in their planar concourse 34 and in the congruity of the plurality of strands as well as an appositive tensioning of each strand is a relatively critical step in fabrication of the tape 30 since the structural integrity of the end product 40 is, to a large degree, predicated upon proper orientation, precise congruity and resultant load carrying integrity of the graphite filament constituents 12.

Conventional structural shapes, such as are employed on components for present day aerospace vehicles, are conventionally fabricated from metal, such as aluminum alloys, steel, titanium and the like. The metals are substantially isotropic in character insofar as their capability for carrying structural loads is concerned. However, the structural loads introduced into aircraft and aerospace vehicles rarely impose isotropic stresses upon their load carrying components when functioning in their normal mode of operation, but rather they impose stress loads that are preponderantly anisotropic in nature; usually being substantially unidirectional. Such structural components, when fabricated from unirradiated, conventional tectonic filamentary composite tapes, realize either an increase in strength or, alternatively, a weight reduction over metal construction of from 40 to 60 percent. This is a direct result of precisely oriented tectonic filaments, which are congruously collocated in planar concourse and the resultant tapes are oriented and laid in directional consonance with the primary stress loads which they must convey; thus providing a substantially unidirectional load bearing stress conduit into the primary structure. While isotropic materials, such as metals, have an inherent capability to distribute primary loads in all directions, they are of necessity, actually utilized for bearing the primary load only in a single general direction; the unstressed and relatively low-stress portions merely constituting dead weight without contributing materially to the load carrying task. Such dead weight is a very material factor imposing a severe useful load penalty on any airborne vehicle or spacecraft.

Inasmuch as each filament of the stressed tectonic composite structure, of which it is an integral element, must bear its proportionate share of the total imposed load, its inherent mechanical and physical characteristics, as well as its physical relationships with other elements and particularly with adjacent strands and matrix material, become critical factors in the fabricating process and in the exactness that is effected when implementing the relationships upon which the processing employed for the tape's fabrication is predicated.

From the above it will be readily apparent to those skilled in the art that spatial placement and adequate tensioning of the tectonic filaments, having such desirable characteristics as flexibility and strength together with functional integrity throughout the filament system, are critical factors which are very germane in the fabrication of tectonic tape, if an end product commensurate with the ultimate functional requirements for such product is to be achieved.

Referring again to FIGS. 1, 3 and 4 of the drawings, upon emergence from pretensioning collocator 32 in planar congruous concourse 34, the irradiated filamentary strands 12 are impregnated with at least one coating of plastic matrix material 36 such as epoxy novolac, i.e., any of the other epoxy polymers or other suitable organic thermosetting resins. Such matrix coatings may be applied by spraying from sprayer 38 or by dipping, brushing, rolling or by other conventional processes known to the art. Polymerization or curing of the impregnated resinous matrix is then effected, preferably by the application of heat from a suitable heat source 42 resultant in tape 30. However, such curing may be effected by allowing the resin to dry at environmental room temperature or by subjecting the resinous plastic materials to relatively low dosages of electronic and gamma rays which ionize the atoms by stripping away their electrons with lightweight low energy particles. The radiation mutation of graphite filaments of the present invention which results in significant strengthening thereof and such radiation curing of the resinous impregnated matrix of the plastic material are in no respect similar-for the atomic processes involved in each are altogether different.

Structural shapes having significantly increased tensile strength together with a very substantial increase in their Young's modulus of elasticity, the tape being oriented for the most effective and efficient load carrying capabilities, are then fabricated by laying the tape and laminating the object composite structural part 40 in a calculated, predetermined shape and configuration over appropriate dies or patterns. This is preferably effected by the employment of a tape laying machine 44 devised for the purpose but may also be accomplished by precise manual placement and detrusion of the component tape lengths 46 in the desired manner.

While in the preferred form of the invention, graphite filament mutation and a resultant strengthening of the fiber and increase in its flexural modulus is effected by subjecting the object material to neutron fluence within a specific range, such irradiation does not preclude the employment of charged-particle strengthening of the graphite filaments. Protons and heavier charged particles are known to be effective in displacing atoms so long as they are sufficiently energetic to just barely penetrate the fibers. Such penetration can easily be effected with energies in the range between 0.1 MeV and 10 MeV inclusive with fluences between $2 \times 10^{16}$ and $1 \times 10^{19}$ inclusive for either protons or alpha particles. Thus such irradiation, when employed in this process, falls within the scope of the present invention and therefore constitutes another embodiment of the process.

In summary, the tectonic filamentary structural shape of the present invention and the method for making same is characterized by its unique transmutation of the crystalline structure of its filamentary elements and the combination of such elements into a plastic matrix material to form a ribbon-like tape component and subsequently combining such tape in juxtapositioned strips and in layered laminations to provide a structural composite shape or part that has significantly higher strength, high modulus of elasticity for flexural strength and lower density resultant in less weight for such strength than has heretofore been possible to achieve in the pertinent art.

I claim:

1. As an article of manufacture, a filamentary composite tectonic tape, which is singularly useful in the fabrication of structural shapes and components for aircraft, missiles, space vehicles and the like, comprising, in combination:

a. a plurality of nuclear mutated graphite filaments, whose constituent crystallites are characterized by a two-dimensional, turbo-stratic lattice structure; said nuclear mutation resultant from transmutation caused by confining said filaments within an ambient environment that is substantially free of oxygen and then subjecting said filaments to high energy neutron fluences (E > 1 MeV), ranging in dosage from $1 \times 10^{18}$ n/cm$^2$ to $1 \times 10^{20}$ n/cm$^2$, inclusive and;

b. an encapsulating matrix of resinous material which has been impregnated into and about said plurality of nuclear mutated graphite filaments; said filaments having previously been congruously collocated in substantial planar concourse.

2. In an article of manufacture, a filamentary composite tectonic shape having significantly improved strength and flexural properties fabricated by the lamination of a plurality of strip segments of said nuclear mutated, filamentary tape composite defined in claim 1; said segments being angular oriented, laminated and cured to define and form rigid filamentary graphite/matrix composite structural shapes which are propitiously useful as tectonic elements in the manufacture of high strength, lightweight structures.

* * * * *